United States Patent
Kubota et al.

(10) Patent No.: US 10,981,478 B2
(45) Date of Patent: Apr. 20, 2021

(54) SEAT FOR VEHICLE

(71) Applicant: TACHI-S CO., LTD., Akishima (JP)

(72) Inventors: Hidekazu Kubota, Akishima (JP);
Masaru Kaneko, Akishima (JP);
Hiroshi Fukushima, Akishima (JP)

(73) Assignee: TACHI-S CO., LTD., Tokyo (JP)

( * ) Notice: Subject to any disclaimer, the term of this patent is extended or adjusted under 35 U.S.C. 154(b) by 49 days.

(21) Appl. No.: 16/372,465

(22) Filed: Apr. 2, 2019

(65) Prior Publication Data
US 2019/0375322 A1 Dec. 12, 2019

(30) Foreign Application Priority Data

Jun. 7, 2018 (JP) .............................. JP2018-109649

(51) Int. Cl.
*B60N 2/68* (2006.01)
*B60N 2/64* (2006.01)

(52) U.S. Cl.
CPC ................. *B60N 2/68* (2013.01); *B60N 2/64* (2013.01); *B60N 2205/20* (2013.01)

(58) Field of Classification Search
None
See application file for complete search history.

(56) References Cited

U.S. PATENT DOCUMENTS

| | | | | |
|---|---|---|---|---|
| 5,626,396 A * | 5/1997 | Kuragano | ................ | B60N 2/68 297/391 |
| 2004/0227389 A1* | 11/2004 | Yoshida | ................... | B60N 2/64 297/452.18 |
| 2013/0069415 A1* | 3/2013 | Yasuda | ................... | B60N 2/686 297/452.18 |
| 2014/0070594 A1* | 3/2014 | Awata | .................... | B60N 2/686 297/452.48 |
| 2014/0375099 A1* | 12/2014 | Kitou | ....................... | B60N 2/68 297/391 |
| 2015/0091355 A1* | 4/2015 | Kitou | ....................... | B60N 2/20 297/354.12 |
| 2015/0251579 A1* | 9/2015 | Line | ........................ | B60N 2/686 297/452.18 |
| 2015/0307006 A1* | 10/2015 | Hayashi | .................. | B60N 2/22 297/344.13 |
| 2018/0037138 A1* | 2/2018 | Tanaka | ................... | B60N 2/123 |
| 2018/0086241 A1* | 3/2018 | Kimura | .................... | B60N 2/68 |
| 2018/0178686 A1* | 6/2018 | Veine | ....................... | B60N 2/68 |
| 2018/0339621 A1* | 11/2018 | Suzuki | .................... | B60N 2/68 |

FOREIGN PATENT DOCUMENTS

JP   2015-067133 A    4/2015
JP   2017-077801 A    4/2017

* cited by examiner

*Primary Examiner* — David R Dunn
*Assistant Examiner* — Christopher E Veraa
(74) *Attorney, Agent, or Firm* — SGPatents PLLC

(57) ABSTRACT

A seat for vehicle includes a seat cushion and a seat back. A seat back frame of the seat back includes a right side frame, a left side frame, a lower frame, and an upper frame. The upper frame includes a first upper frame and a second upper frame, the first upper frame having a cross-sectional shape of a U-shape opening downward, the second upper frame having a cross-sectional shape of a U-shape opening downward, and a closed cross section is configured by vertically overlaying the first upper frame and the second upper frame.

3 Claims, 7 Drawing Sheets

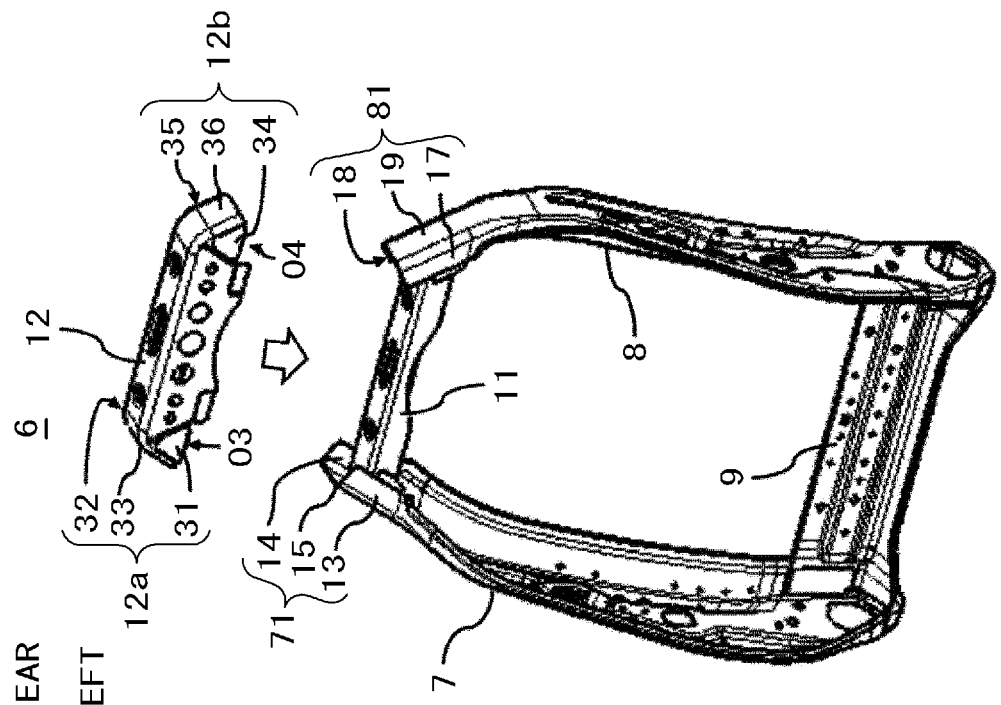
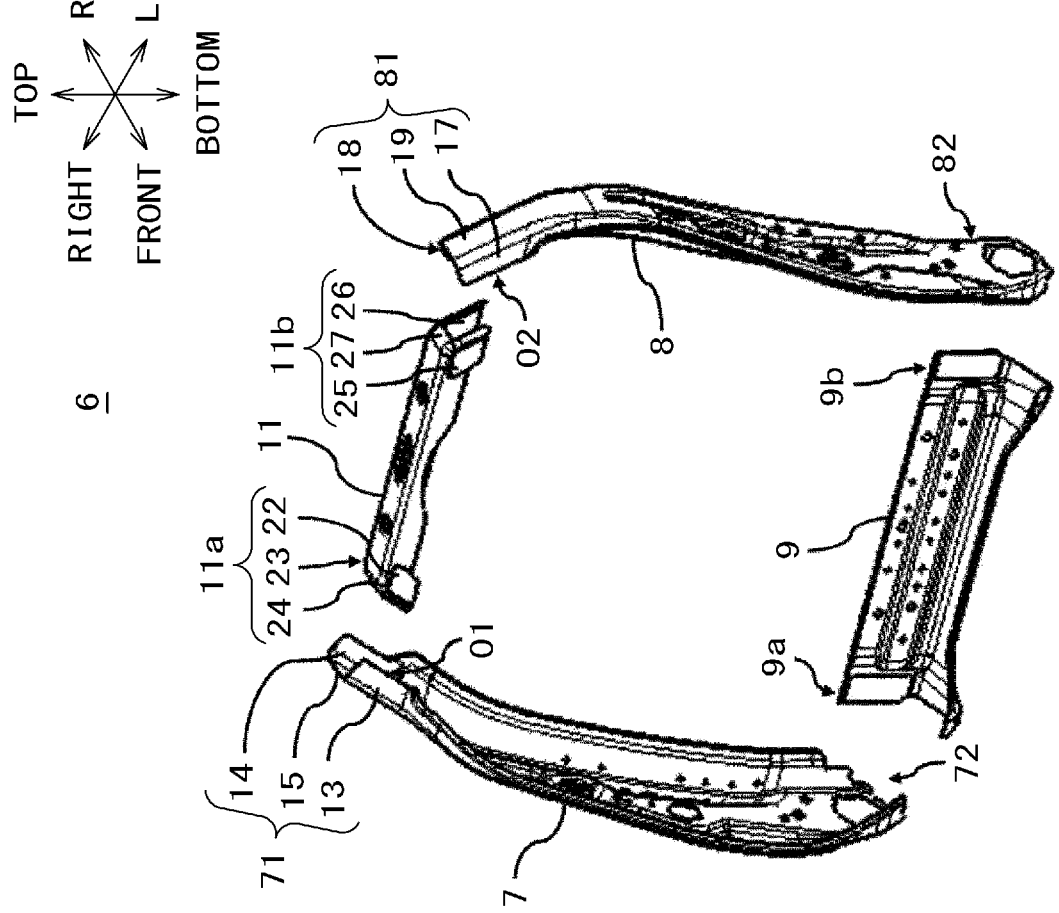

REAR ⟷ FRONT

REAR ⟷ FRONT

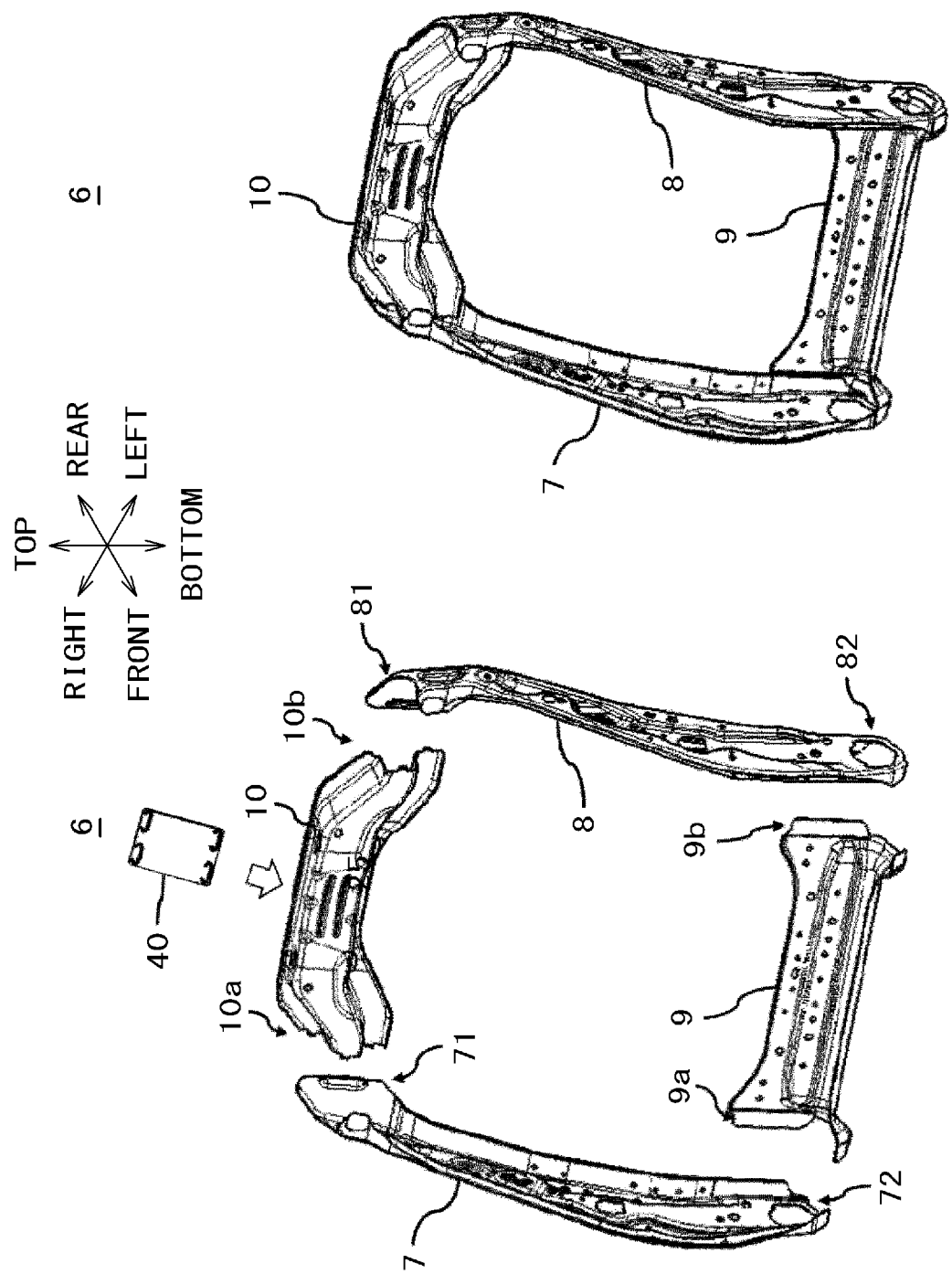

REAR ⟵⟶ FRONT

US 10,981,478 B2

SEAT FOR VEHICLE

CLAIM OF PRIORITY

The present application claims priority from Japanese Patent Application JP 2018-109649 filed on Jun. 7, 2018, the content of which is hereby incorporated by reference into this application.

BACKGROUND OF THE INVENTION

Technical Field

The present invention relates to a seat for vehicle, and can be applied to a seat for vehicle including a seat back frame in particular.

Background Art

A seat for vehicle includes a seat cushion and a seat back, and a seat back frame that configures the seat back is configured by combining a left and right side frames, a lower frame, and an upper frame into a frame shape by welding and the like. There is a case that the upper frame of this kind is configured by a steel sheet that is press-formed to have a hat-shape cross section opening rearward (refer to JP-A No. 2015-67133). Also, there is a case that a seat back frame is configured by bending a round pipe (refer to JP-A No. 2017-77801).

SUMMARY OF THE INVENTION

The present inventors have executed studies for improving the torsional rigidity of a seat back. According to the studies, it has been found that a seat back frame using an upper frame having a hat-shape cross section opening rearward has lower torsional rigidity compared to a pipe structure because the upper frame has an open cross section. Therefore, there is a case that rigidity required for a seat back frame is not secured unless the shape of the component of the upper frame having the hat-shape cross section is made complicated and enlarged and is made to have a thicker thickness in order to improve the torsional rigidity of a seat back frame using the upper frame having the hat-shape cross section opening rearward.

Also, because a seat back frame configured by bending a round pipe has a constant closed cross section, its rigidity is comparatively high. However, there is a case that dimensional accuracy allowing laser welding is hardly secured.

The object of the present invention is to provide a seat for vehicle including a back frame having a panel structure improving torsional rigidity and allowing welding.

Other problems and novel features will be clarified from the description of the present description and the attached drawings.

A summary of a representative one of the present invention will be explained below briefly.

A seat for vehicle includes a seat cushion and a seat back. A seat back frame of the seat back includes a right side frame, a left side frame, a lower frame, and an upper frame. The upper frame includes a first upper frame and a second upper frame, the first upper frame having a cross-sectional shape of a U-shape opening downward, the second upper frame having a cross-sectional shape of a U-shape opening downward, and a closed cross section is configured by vertically overlaying the first upper frame and the second upper frame. Also, joining of the first upper frame and the second upper frame as well as joining of the first upper frame and the second upper frame and the right side frame and the left side frame are effected by welding.

According to the seat for vehicle described above, rigidity of the seat back frame can be improved. Also, according to the seat for vehicle described above, mass productivity can be improved.

BRIEF DESCRIPTION OF THE DRAWINGS

FIG. 3A is a drawing for explaining a seat back frame, and is a drawing for explaining assembling of a right side frame, a left side frame, a lower frame, and a first upper frame;

FIG. 3B is a drawing for explaining assembling of a second upper frame;

FIG. 6A is a drawing for explaining a seat back frame related to the second embodiment, and is a drawing for explaining assembling of left and right side frames, a lower frame, an upper frame, and a bracket;

FIG. 6B is a front perspective view of a back frame having been assembled;

DETAILED DESCRIPTION OF THE PREFERRED EMBODIMENTS

Figure 1:
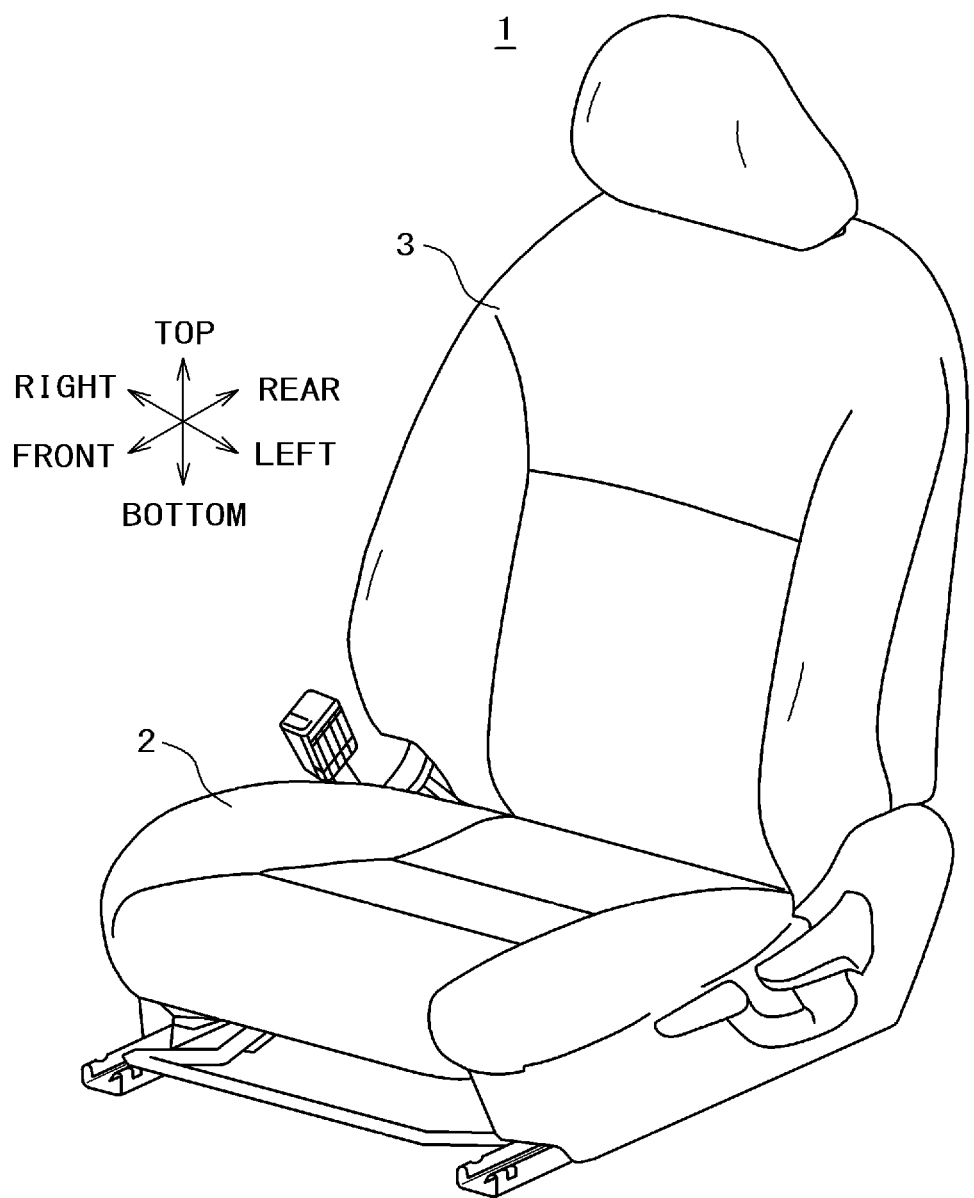
FIG. 1 is a front perspective view of a seat for vehicle related to the first embodiment.

Below, embodiments of the present invention will be explained referring to the drawings.

Also, the disclosure is only an example, and there is a case that a drawing is expressed schematically with respect to the width, thickness, shape and the like of each section in comparison to an actual aspect in order to make the explanation clearer; however, such drawing does not restrict interpretation of the present invention. Further, in the present description and each drawing, there is a case that an element similar to one described before with respect to a drawing having been shown is marked with a same reference sign and detailed explanation is omitted from time to time. Also, in the drawings, an arrow front expresses forward of the vehicle, an arrow rear expresses rearward of the vehicle, an arrow left expresses left sideways of the vehicle, an arrow right expresses right sideways of the vehicle, an arrow top expresses upward of the vehicle, and an arrow bottom expresses downward of the vehicle. Further, in explanation below, unless particularly stated otherwise, front, rear, top, bottom, left, and right are to mean front, rear, top, bottom, left, and right with respect to the vehicle.

First Embodiment

Figure 2:
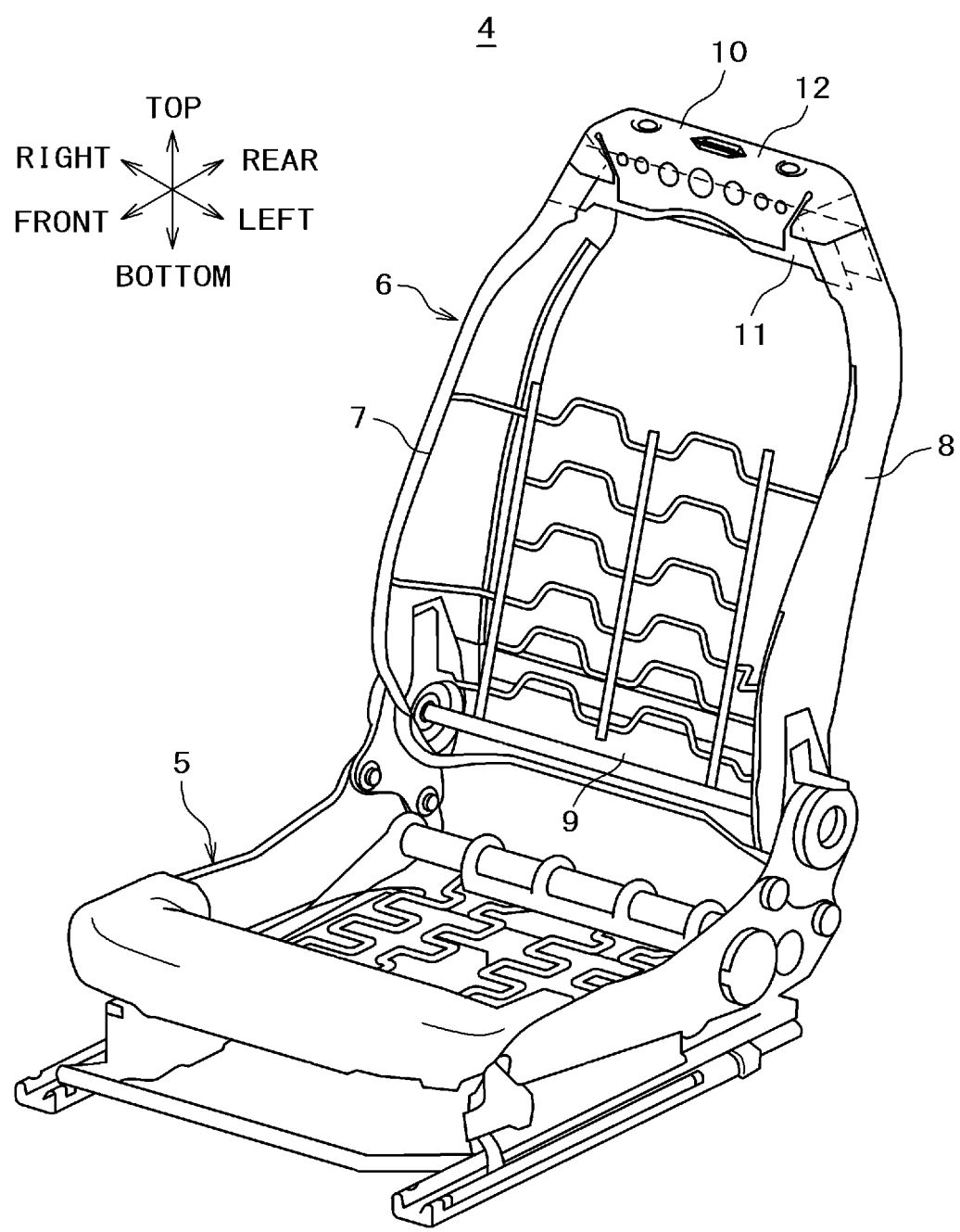
FIG. 2 is a front perspective view of a seat frame of the seat for vehicle shown in FIG. 1.
Figure 4A:
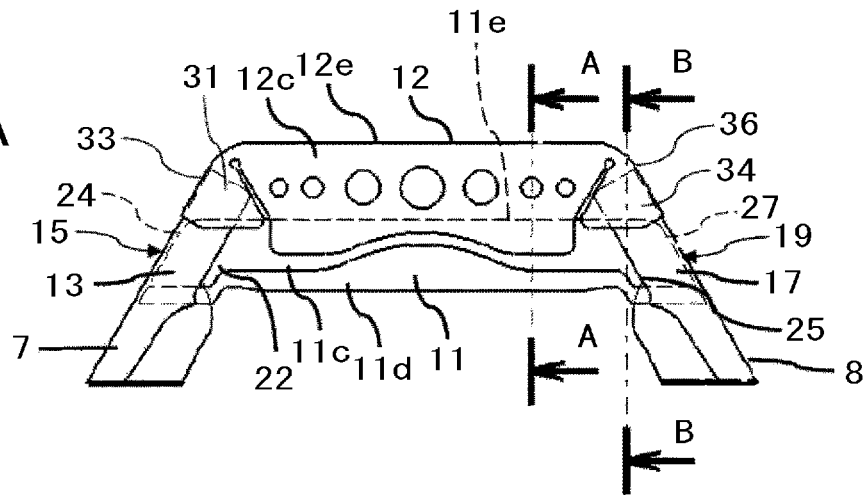
FIG. 4A is a drawing for explaining assembling of the left and right side frames and the first and second upper frames, and is a front surface enlarged view of the upper part of a seat back frame.
Figure 4B:
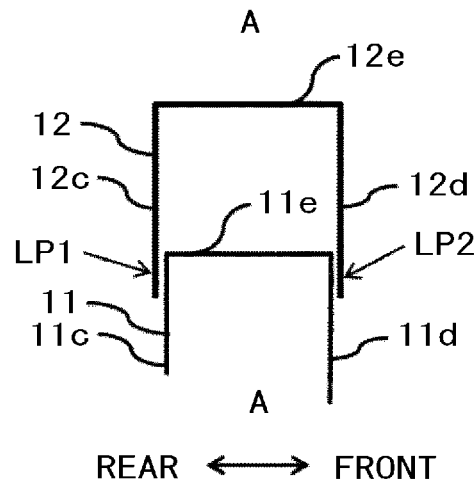
FIG. 4B is a cross-sectional view along the line A-A shown in FIG. 4A.
Figure 4C:
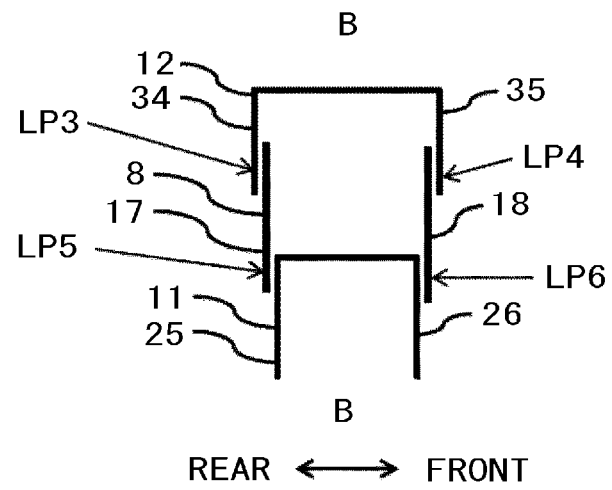
FIG. 4C is a cross-sectional view along the line B-B shown in FIG. 4A.
Figure 5A:
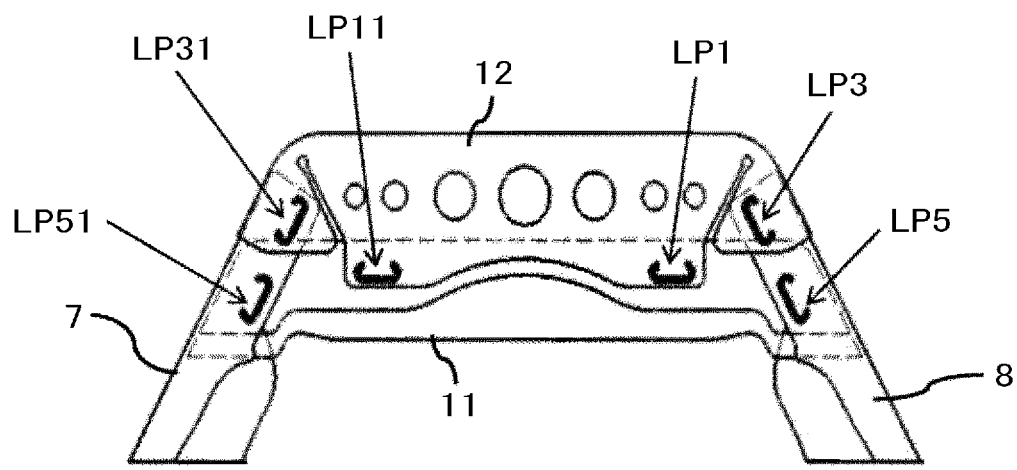
FIG. 5A is a drawing for explaining a welding position of the left and right side frames and the first and second upper frames, and is a front enlarged view of the upper part of the seat back frame.
Figure 5B:
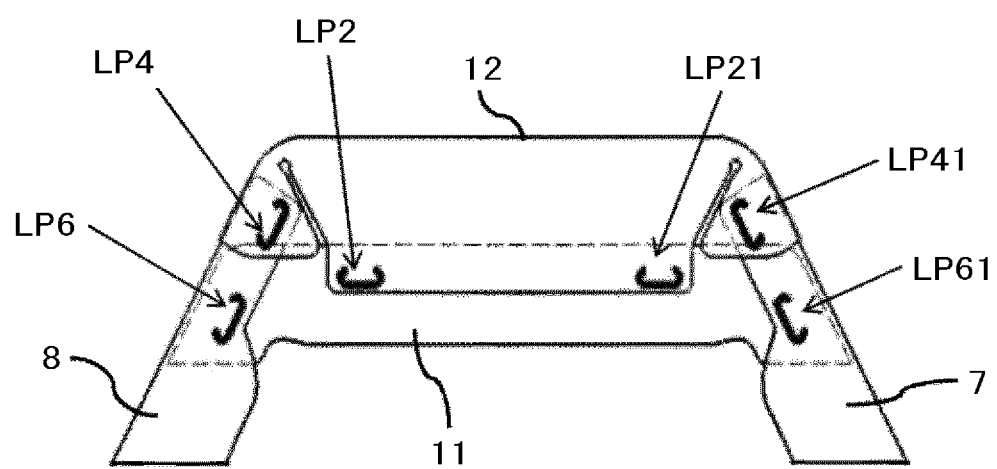
FIG. 5B is a drawing for explaining a welding position of the left and right side frames and the first and second upper frames, and is a rear enlarged view of the upper part of the seat back frame.

FIG. 1 is a front perspective view of a seat for vehicle related to the first embodiment. FIG. 2 is a front perspective view of a seat frame of the seat for vehicle shown in FIG. 1. FIG. 3A and FIG. 3B are drawings for explaining a seat back frame, FIG. 3A is a drawing for explaining assembling of left and right side frames, a lower frame, and a first upper frame, and FIG. 3B is a drawing for explaining assembling of a second upper frame. FIG. 4A, FIG. 4B, and FIG. 4C are drawings for explaining assembling of the left and right side frames and the first and second upper frames, FIG. 4A is a front surface enlarged view of the upper part of the seat back frame, FIG. 4B is a cross-sectional view along the line A-A shown in FIG. 4A, and FIG. 4C is a cross-sectional view along the line B-B shown in FIG. 4A. FIG. 5A and FIG. 5B are drawings for explaining a welding position of the left and right side frames and the first and second upper frames, FIG. 5A is a front enlarged view of the upper part of the seat back frame, and FIG. 5B is a rear enlarged view of the upper part of the seat back frame.

As shown in FIG. 1, a seat for vehicle 1 is configured by combining a seat cushion 2 and a seat back 3. The seat cushion 2 configures a seat surface, and the seat back 3 configures a backrest. The seat for vehicle 1 has a reclining function that allows angle adjustment between the seat cushion 2 and the seat back 3, and the seat cushion 2 and the seat back 3 are connected to each other by the reclining function.

FIG. 2 shows a seat frame 4 of a case a cushion material and a seat skin of the seat for vehicle 1 of FIG. 1 are removed. The seat frame 4 includes a seat cushion frame (will be hereinafter referred to also as a cushion frame) 5 and a seat back frame (will be hereinafter referred to also as a back frame) 6. The back frame 6 is configured by combining a right side frame 7, a left side frame 8, a lower frame 9, and an upper frame 10 into a frame shape. Also, the lower frame 9 can be translated into a lower panel. Further, the upper frame 10 can be translated into an upper panel.

Each of the right side frame 7 and the left side frame 8 is configured of a steel sheet that is press-formed. At the lower part of each of the right side frame 7 and the left side frame 8, a lower flange for attaching the lower frame 9 is arranged. Also, at the upper part of each of the right side frame 7 and the left side frame 8, an upper flange for attaching the upper frame 10 is arranged.

The lower frame 9 is configured of a steel sheet that is press-formed. Flanges arranged at the left end and the right end of the lower frame 9 are joined to the lower flange of the right side frame 7 and the lower flange of the left side frame 8 by laser welding or arc welding for example. Also, in order to improve mass productivity of the lower frame 9, it is preferable to use laser welding.

The upper frame 10 includes a first upper frame (will be hereinafter referred to also as a lower part upper frame) 11 configured of a steel sheet that is press-formed into a cross-sectional shape of a U-shape opening downward and a second upper frame (will be hereinafter referred to also as an upper part upper frame) 12 configured of a steel sheet that is press-formed into a cross-sectional shape of a U-shape opening downward. In the upper frame 10, the upper part of the U-shape of the first upper frame is combined so as to be overlaid to the recess of the U-shape opening downward of the second upper frame. Thus, by overlaying the first upper frame having a cross-sectional shape of the U-shape opening downward and the second upper frame having a cross-sectional shape of the U-shape opening downward, the upper frame 10 formed into a closed cross section is configured, and therefore torsional rigidity of the back frame 6 can be improved. Also, the first upper frame 11 can be translated into a first upper panel or a lower part upper panel. Further, the second upper frame 12 can be translated into a second upper panel or an upper part upper panel.

Also, because each of the right side frame 7, the left side frame 8, the lower frame 9, the first upper frame, and the second upper frame are configured of a steel sheet that is press-formed, they have dimensional accuracy allowing laser welding.

The configuration and assembling of the back frame 6 will be explained in more detail using FIG. 3A and FIG. 3B.

As shown in FIG. 3A, the right side frame 7 includes an upper flange 71 and a lower flange 72. The upper flange 71 of the right side frame 7 includes a first flange 13 and a second flange 14 which oppose each other in the front-rear direction, and a third flange 15 that is arranged between the first flange 13 and the second flange 14. The upper flange 71 slightly inclines to the left direction as viewed from the rear, and includes an opening O1 that is surrounded by the first flange 13, the second flange 14, and the third flange 15.

The left side frame 8 includes an upper flange 81 and a lower flange 82. The upper flange 81 of the left side frame 8 includes a first flange 17 and a second flange 18 which oppose each other in the front-rear direction, and a third flange 19 that is arranged between the first flange 17 and the second flange 18. The upper flange 81 slightly inclines to the right direction as viewed from the rear, and includes an opening O2 that is surrounded by the first flange 17, the second flange 18, and the third flange 19.

As shown in FIG. 3A, the first upper frame 11 includes a right flange 11a and a left flange 11b. The right flange 11a of the first upper frame 11 includes a first flange 22 and a second flange 23 which oppose each other in the front-rear direction, and a third flange 24 that is arranged between the first flange 22 and the second flange 23. The first flange 22, the second flange 23, and the third flange 24 have inclination similar to that of the upper flange 71 inclining to the left direction of the right side frame 7 as viewed from the rear, and are configured to be inserted to the inside of the opening O1 arranged in the upper flange 71 of the right side frame 7 (refer to FIG. 4A). That is to say, in the right flange 11a of the first upper frame 11, the first flange 22 is inserted to the first flange 13 of the right side frame 7 so as to abut, the second flange 23 is inserted to the second flange 14 of the right side frame 7 so as to abut, the third flange 24 is inserted to the third flange 15 of the right side frame 7 so as to abut, and they are fixed by laser welding or arc welding for example.

In a similar manner, the left flange 11b of the first upper frame 11 includes a first flange 25 and a second flange 26 which oppose each other in the front-rear direction, and a third flange 27 that is arranged between the first flange 25 and the second flange 26. The first flange 25, the second flange 26, and the third flange 27 have inclination similar to that of the upper flange 81 inclining to the right direction of the left side frame 8 as viewed from the rear, and are configured to be inserted to the inside of the opening O2 arranged in the upper flange 81 of the left side frame 8 (refer to FIG. 4A). That is to say, in the left flange 11b of the first upper frame 11, the first flange 25 is inserted to the first flange 17 of the left side frame 8 so as to abut, the second flange 26 is inserted to the second flange 18 of the left side frame 8 so as to abut, the third flange 27 is inserted to the third flange 19 of the left side frame 8 so as to abut, and they are fixed by laser welding or arc welding for example.

As shown in FIG. 3A, the lower frame 9 includes a right flange 9a and a left flange 9b. The right flange 9a of the lower frame 9 is fixed to the lower flange 72 of the right side frame 7 by laser welding or arc welding for example. In a similar manner, the left flange 9b of the lower frame 9 is fixed to the lower flange 82 of the left side frame 8 by laser welding or arc welding for example.

In FIG. 3B, such state is shown that the back frame 6 shown in FIG. 3A as assembled with the right side frame 7, the left side frame 8, the lower frame 9, and the first upper frame 11 is further assembled with the second upper frame 12.

As shown in FIG. 3B, the second upper frame 12 includes a right flange 12a and a left flange 12b. The right flange 12a of the second upper frame 12 includes a first flange 31 and a second flange 32 which oppose each other in the front-rear direction, and a third flange 33 that is arranged between the first flange 31 and the second flange 32. The right flange 12a has an opening O3 that is configured by the first flange 31, the second flange 32, and the third flange 33. The first flange 31, the second flange 32, and the third flange 33 have inclination similar to that of the upper flange 71 inclining to the left direction of the right side frame 7 as viewed from the rear, and it is configured that the upper flange 71 of the right side frame 7 is inserted to the inside of the opening O3 of the right flange 12a (refer to FIG. 4A). That is to say, in the right flange 12a of the second upper frame 12, the first flange 31 is inserted to the first flange 13 of the right side frame 7 so as to abut, the second flange 32 is inserted to the second flange 14 of the right side frame 7 so as to abut, the third flange 33 is inserted to the third flange 15 of the right side frame 7 so as to abut, and they are fixed by laser welding or arc welding for example.

In a similar manner, the left flange 12b of the second upper frame 12 includes a first flange 34 and a second flange 35 which oppose each other in the front-rear direction, and a third flange 36 that is arranged between the first flange 34 and the second flange 35. The left flange 12b has an opening 35, and the third flange 36. The first flange 34, the second flange 35, and the third flange 36 have inclination similar to that of the upper flange 81 inclining to the right direction of the left side frame 8 as viewed from the rear, and it is configured that the upper flange 81 of the left side frame 8 is inserted to the inside of the opening O4 of the left flange 12b (refer to FIG. 4A). That is to say, in the left flange 12b of the second upper frame 12, the first flange 34 is inserted to the first flange 17 of the left side frame 8 so as to abut, the second flange 35 is inserted to the second flange 18 of the left side frame 8 so as to abut, the third flange 36 is inserted to the third flange 19 of the left side frame 8 so as to abut, and they are fixed by laser welding or arc welding for example.

As shown in FIG. 4B, the second upper frame 12 is a steel sheet that is press-formed into a cross-sectional shape of a U-shape opening downward, and includes a front sheet 12c and a rear sheet 12d which oppose each other in the front-rear direction, and an upper sheet 12e that is arranged between the front sheet 12c and the rear sheet 12d. In a similar manner, the first upper frame 11 is a steel sheet that is press-formed into a cross-sectional shape of a U-shape opening downward, and includes a front sheet 11c and a rear sheet 11d which oppose each other in the front-rear direction, and an upper sheet 11e that is arranged between the front sheet 11c and the rear sheet 11d. The upper sheet 11e of the first upper frame 11, the upper part of the front sheet 11c, and the upper part of the rear sheet 11d are disposed so as to enter the recess that is arranged between the front sheet 12c and the rear sheet 12d of the second upper frame 12, and the front sheet 12c and the rear sheet 12d of the second upper frame 12 come to be fixed to the upper part of the front sheet 11c and the upper part of the rear sheet 11d of the first upper frame 11 respectively at welding positions LP1, LP2 by laser welding or arc welding.

Accordingly, because the upper sheet 11e of the first upper frame 11, the upper part of the front sheet 11c, and the upper part of the rear sheet 11d are disposed so as to enter the recess that is arranged between the front sheet 12c and the rear sheet 12d of the second upper frame 12, a rectangular closed cross section is configured. In other words, the first upper frame 11 is sandwiched between the upper flange 71 of the right side frame 7 and the upper flange 81 of the left side frame 8 and is closed in a manner of being capped by the second upper frame 12 from above, and the rectangular closed cross section is configured. Thereby, torsional rigidity of the back frame 6 can be improved tremendously compared to a back frame using an upper frame having a hat-shape cross section.

Also, as shown in FIG. 4C, the first flange 34 and the second flange 35 of the second upper frame 12 are arranged so as to sandwich the first flange 17 and the second flange 18 of the left side frame 8, and the first flange 34 and the second flange 35 of the second upper frame 12 come to be fixed to the first flange 17 and the second flange 18 of the left side frame 8 respectively at welding positions LP3, LP4 by laser welding or arc welding. Further, the first flange 25 and the second flange 26 of the first upper frame 11 are disposed so as to be inserted between the first flange 17 and the second flange 18 of the left side frame 8, and the first flange 25 and the second flange 26 of the first upper frame 11 come to be fixed to the first flange 17 and the second flange 18 of the left side frame 8 respectively at welding positions LP5, LP6 by laser welding or arc welding.

Furthermore, although FIG. 4B and FIG. 4C described connection of the first and second upper frames 11, 12 and the left side frame 8, connection of the first and second upper frames 11, 12 and the right side frame 7 is also executed by a similar concept.

As shown in FIG. 5A, in front of the upper part of the back frame 6, the left side frame 8 and the first upper frame 11 and the second upper frame 12 are welded by the welding positions LP1, LP3, and LP5 as explained in FIG. 4B and FIG. 4C. In a similar manner, laser welding or arc welding of the right side frame 7 and the first upper frame 11 and the second upper frame 12 is executed by welding positions LP11, LP31, and LP51. The welding position LP11 shows a welding position of the front sheet 12c of the second upper frame 12 and the front sheet 11c of the first upper frame 11. The welding position LP31 shows a welding position of the first flange 31 of the second upper frame 12 and the first flange 13 of the right side frame 7. The welding position LP51 shows a welding position of the first flange 13 of the right side frame 7 and the first flange 22 of the first upper frame 11.

Also, as shown in FIG. 5B, behind the upper part of the back frame 6, the left side frame 8 and the first upper frame 11 and the second upper frame 12 are welded by the welding positions LP2, LP4, and LP6 as explained in FIG. 4B and FIG. 4C. In a similar manner, laser welding or arc welding of the right side frame 7 and the first upper frame 11 and the second upper frame 12 is executed by welding positions LP21, LP41, and LP61. The welding position LP21 shows a welding position of the rear sheet 12d of the second upper frame 12 and the rear sheet 11d of the first upper frame 11. The welding position LP41 shows a welding position of the second flange 32 of the second upper frame 12 and the second flange 14 of the right side frame 7. The welding position LP61 shows a welding position of the second flange 14 of the right side frame 7 and the second flange 23 of the first upper frame 11.

According to the first embodiment, effects described below can be secured.

1) The first upper frame 11 is sandwiched between the upper flange 71 of the right side frame 7 and the upper flange 81 of the left side frame 8 and is closed in a manner of being capped by the second upper frame 12 from above, and the rectangular closed cross section is configured. Thereby, rigidity of the back frame 6 in the torsional direction can be improved tremendously. The deflection amount of the back frame 6 can be reduced by approximately 60% for example compared to an upper frame having a hat-shape cross-sectional construction.

2) In 1) described above, the right flange 11a and the left flange 11b of the first upper frame 11, the right flange 12a and the left flange 12b of the second upper frame 12, the upper flange 71 of the right side frame 7 and the upper flange 81 of the left side frame 8 can be fixed by laser welding. Therefore, although laser welding is hard with respect to a seat back frame configured by bending a round pipe because of a problem of the dimensional accuracy, by the present invention, it is possible to provide a configuration of the back frame 6 having a panel structure where laser welding is applicable although it has high rigidity. Accordingly, mass productivity of the seat for vehicle 1 can be improved.

3) In 1) described above, because the upper frame 10 (the first upper frame 11, the second upper frame 12) is made to have a rectangular cross section, even when the right side frame 7, the left side frame 8, and the lower frame 9 are made compact or thin, torsional rigidity of the back frame 6 can be kept high. Therefore, the weight of the back frame 6 can be reduced. Also, the manufacturing cost of the back frame 6 can be reduced.

4) By 3) described above, the right side frame 7 and the left side frame 8 can be made compact, or can be made slender in the front-rear direction for example, and therefore the thickness of the seat back 3 can be made thin. Thereby, when the seat for vehicle 1 of the present invention is utilized as a driver's seat or a front passenger seat, a space behind the seat for vehicle 1 can be widened by approximately 10 mm for example. That is to say, the distance between the seat for vehicle 1 of the driver's seat or the front passenger seat and the vehicle seat of the rear seat can be increased.

Second Embodiment

The second embodiment has a configuration that, behind the upper frame 10 having a cross-sectional shape of a hat shape, a bracket 40 like a rectangular flat sheet member for example is fixed so as to connect upper and lower flanges (10c, 10d) of the recessed part having a cross-sectional shape of a hat shape, and torsional rigidity of the back frame 6 is improved. Below, the second embodiment will be explained using FIG. 6A, FIG. 6B, FIG. 7A, and FIG. 7B. Further, although the bracket 40 is shown illustratively as a rectangular flat sheet member, it only has to be a fixing member that can connect the upper and lower flanges (10c, 10d) of the recessed part having a cross-sectional shape of a hat shape.

Figure 7A:
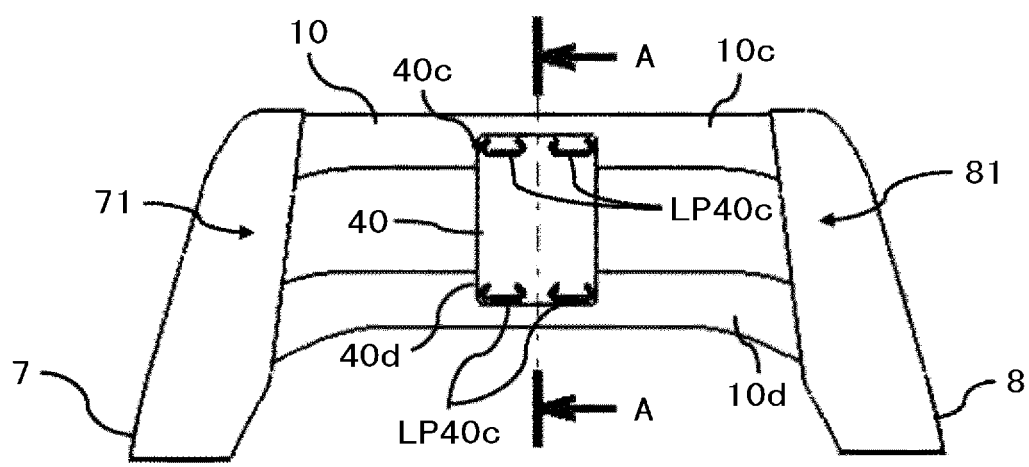
FIG. 7A is a rear elevation view of the upper part of the back frame, and is a drawing for explaining assembling of the upper frame and the bracket.
Figure 7B:
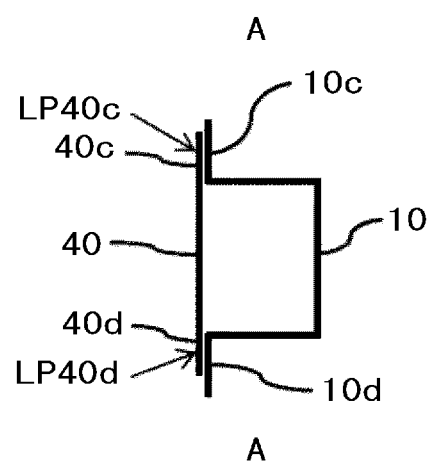
FIG. 7B is a cross-sectional view along the line A-A shown in FIG. 7A.

FIG. 6A and FIG. 6B are drawings for explaining the back frame 6 related to the second embodiment, FIG. 6A is a drawing for explaining assembling of the left and right side frames, the lower frame, the upper frame, and the bracket, and FIG. 6B is a front perspective view of the back frame 6 having been assembled. FIG. 7A and FIG. 7B are rear elevation views of the upper part of the back frame 6, FIG. 7A is a drawing for explaining assembling of the upper frame and the bracket, and FIG. 7B is a cross-sectional view along the line A-A shown in FIG. 7A.

With reference to FIG. 6A and FIG. 6B, the right side frame 7 includes the upper flange 71 and the lower flange 72. The left side frame 8 includes the upper flange 81 and the lower flange 82. The lower frame 9 includes the right flange 9a and the left flange 9b. The right flange 9a of the lower frame 9 is fixed to the lower flange 72 of the right side frame 7 by laser welding for example. In a similar manner, the left flange 9b of the lower frame 9 is fixed to the lower flange 82 of the left side frame 8 by laser welding or arc welding for example. The upper frame 10 includes a right flange 10a and a left flange 10b. The upper frame 10 has a cross-sectional shape of a hat shape opening rearward. The bracket 40 like a rectangular flat sheet member is arranged so as to partially connect the generally center region or the vicinity of the center region of the upper and lower flanges of the upper frame 10. Thereby, rigidity of the upper frame 10 is enhanced compared to a case the bracket 40 is not used. The right flange 10a of the upper frame 10 is fixed to the upper flange 71 of the right side frame 7 by laser welding or arc welding for example. The left flange 10b of the upper frame 10 is fixed to the upper flange 81 of the left side frame 8 by laser welding or arc welding for example.

As shown in FIG. 7A and FIG. 7B, the upper frame 10 includes an upper flange 10c and a lower flange 10d. The bracket 40 is joined to the center region or the vicinity of the center region of the rear part of the upper frame 10. The upper flange 40c of the bracket 40 is fixed to the upper flange 10c of the upper frame 10 by 2 positions of welding positions LP40c by laser welding or arc welding for example. Also, a lower part 40d of the bracket 40 is fixed to the lower flange 10d of the upper frame 10 by 2 positions of welding positions LP40d by laser welding or arc welding for example.

Also, the upper frame 10 and the bracket 40 can be collectively considered to be an upper frame or an upper panel. In this case, the upper frame 10 having a cross-sectional shape of a hat shape opening rearward can be translated into a frame. That is to say, the upper frame includes the frame 10 having a cross-sectional shape of a hat shape opening rearward and the bracket 40.

Further, although an example of arranging one bracket 40 is shown, the present invention is not limited to it. Plural brackets 40 may be arranged behind the upper frame 10. The contour shape of the bracket 40 as a fixing member is not limited to a rectangular shape, and a triangle shape, a trapezoidal shape, a circular shape, an ellipsoidal shape, a polygonal shape, and the like can be also employed. Further, the bracket 40 is not limited to a flat sheet member, and may be a sheet member such as a corrugated plate.

According to the second embodiment, the bracket 40 is fixed between the upper flange 10c and the lower flange 10d of the upper frame 10 in the center region behind the upper frame 10 having a cross-sectional shape of a hat shape opening rearward. This acts so that the distance between the upper flange 10c and the lower flange 10d of the upper frame 10 does not change, and therefore torsional rigidity of the back frame 6 is improved. The deflection amount of the back frame 6 using the upper frame 10 where the bracket 40 is arranged can be reduced by approximately 40% for example compared to, for example, a back frame using an upper frame not provided with the bracket 40 and having a hat-shape cross-sectional shape.

Therefore, even when the right side frame 7, the left side frame 8, and the lower frame 9 are made compact or thin, torsional rigidity of the back frame 6 can be kept high. Accordingly, the weight of the back frame 6 can be reduced. Also, the manufacturing cost of the back frame 6 can be reduced.

Further, because the right side frame 7 and the left side frame 8 can be made compact, or can be made slender in the front-rear direction for example, the thickness of the seat back 3 can be made thin. Thereby, when the seat for vehicle 1 of the present invention is utilized as a driver's seat or a front passenger seat, a space on the rear side of the seat for vehicle 1 can be widened by approximately 10 mm for example.

Although the invention achieved by the present inventors has been explained above specifically based on the embodiments, it is needless to mention that the present invention is not limited to the embodiments and examples described above and various alterations are possible.

What is claimed is:

1. A seat for vehicle, comprising:
a seat cushion; and
a seat back,
wherein a seat back frame of the seat back includes a right side frame, a left side frame, a lower frame, and an upper frame,
the upper frame includes a first upper frame and a second upper frame, the first upper frame having a cross-sectional shape of a U-shape opening downward, the second upper frame having a cross-sectional shape of a U-shape opening downward,
a closed cross section is configured by vertically overlaying the first upper frame and the second upper frame,
each of the right side frame and the left side frame includes an upper flange that includes an opening,
the first upper frame includes a right flange and a left flange,
the right flange of the first upper frame is inserted to the opening of the right side frame,
the left flange of the first upper frame is inserted to the opening of the left side frame,
the second upper frame includes a right flange that includes an opening and a left flange that includes an opening,
the upper flange of the right side frame is inserted to the opening of the right flange of the second upper frame, and
the upper flange of the left side frame is inserted to the opening of the left flange of the second upper frame.

2. A seat for vehicle, comprising:
a seat cushion; and
a seat back,
wherein a seat back frame of the seat back includes a right side frame, a left side frame, a lower frame, and an upper frame,
the upper frame includes a first upper frame and a second upper frame, the first upper frame having a cross-sectional shape of a U-shape opening downward, the second upper frame having a cross-sectional shape of a U-shape opening downward,
a closed cross section is configured by vertically overlaying the first upper frame and the second upper frame, and
joining of the first upper frame and the second upper frame and joining of the first upper frame and the second upper frame and the right side frame and the left side frame are effected by laser welding.

3. The seat for vehicle according to claim 2, wherein joining of the lower frame and the right side frame and the left side frame is effected by laser welding.

* * * * *